(12) United States Patent
Hawthorne et al.

(10) Patent No.: US 10,339,700 B2
(45) Date of Patent: Jul. 2, 2019

(54) MANIPULATING VIRTUAL OBJECTS ON HINGED MULTI-SCREEN DEVICE

(71) Applicant: Microsoft Technology Licensing, LLC, Redmond, WA (US)

(72) Inventors: Bryant Daniel Hawthorne, Duvall, WA (US); Mario Emmanuel Maltezos, Redmond, WA (US); Christian Michael Sadak, Seattle, WA (US); Adolfo Hernandez Santisteban, Bothell, WA (US); John Benjamin Hesketh, Kirkland, WA (US); Timothy D. Kviz, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/640,265

(22) Filed: Jun. 30, 2017

(65) Prior Publication Data
US 2018/0330535 A1 Nov. 15, 2018

Related U.S. Application Data

(60) Provisional application No. 62/506,492, filed on May 15, 2017.

(51) Int. Cl.
*G06T 15/20* (2011.01)
*G06F 3/01* (2006.01)
(Continued)

(52) U.S. Cl.
CPC ............ *G06T 15/20* (2013.01); *G06F 1/1616* (2013.01); *G06F 1/1637* (2013.01); *G06F 1/1656* (2013.01); *G06F 1/1677* (2013.01); *G06F 1/1681* (2013.01); *G06F 3/013* (2013.01); *G06F 3/1423* (2013.01); *G06T 11/00* (2013.01); *G06F 3/0488* (2013.01)

(58) Field of Classification Search
CPC ....... G06T 15/20; G06T 11/00; G06F 1/1616; G06F 1/1637; G06F 1/1656; G06F 1/1677; G06F 1/1681; G06F 3/013; G06F 3/1423; G06F 3/0488
See application file for complete search history.

(56) References Cited

U.S. PATENT DOCUMENTS 5,640,171 A * 6/1997 Shimada .............. G02B 27/017
345/8
7,371,163 B1 * 5/2008 Best ........................ A63F 13/10
463/1

(Continued)

FOREIGN PATENT DOCUMENTS

JP 2011107711 A 6/2011

*Primary Examiner* — Abderrahim Merouan
(74) *Attorney, Agent, or Firm* — Alleman Hall Creasman & Tuttle LLP

(57) ABSTRACT

A hinged multi-screen computing device is provided that includes a housing having first and second parts coupled by a hinge, each part including a display, a sensor mounted in the housing and configured to detect a hinge angle between the first and second parts, and processor configured to render and display a three-dimensional representation of a virtual object on the first display, the three-dimensional view of the virtual object being rendered based upon the detected hinge angle.

18 Claims, 10 Drawing Sheets

(51) Int. Cl.
*G06T 11/00* (2006.01)
*G06F 3/14* (2006.01)
*G06F 1/16* (2006.01)
*G06F 3/0488* (2013.01)

(56) References Cited

U.S. PATENT DOCUMENTS

| | | | |
|---|---|---|---|
| 8,711,091 B2 | 4/2014 | Nomura et al. | |
| 8,760,367 B2* | 6/2014 | Yoshino | G06F 3/1438 345/4 |
| 8,854,447 B2 | 10/2014 | Conness et al. | |
| 2005/0245313 A1* | 11/2005 | Yoshino | G06F 1/1616 463/30 |
| 2006/0152433 A1* | 7/2006 | Chang | G02B 27/225 345/1.1 |
| 2009/0221335 A1* | 9/2009 | Nakazawa | H04M 1/0216 455/575.4 |
| 2010/0128112 A1 | 5/2010 | Marti et al. | |
| 2010/0188503 A1* | 7/2010 | Tsai | G01C 21/20 348/142 |
| 2010/0245369 A1* | 9/2010 | Yoshino | G06F 3/1438 345/522 |
| 2011/0248987 A1* | 10/2011 | Mitchell | G06T 15/20 345/419 |
| 2012/0050493 A1* | 3/2012 | Ernst | G02B 27/017 348/47 |
| 2012/0306782 A1* | 12/2012 | Seo | G06F 1/1616 345/173 |
| 2013/0021266 A1 | 1/2013 | Selim | |
| 2013/0076679 A1 | 3/2013 | Kretz | |
| 2014/0098188 A1* | 4/2014 | Kwak | G06T 3/40 348/38 |
| 2014/0098198 A1* | 4/2014 | Lee | H04N 13/0246 348/48 |
| 2014/0101578 A1 | 4/2014 | Kwak et al. | |
| 2014/0184628 A1* | 7/2014 | Lee | G06F 3/1423 345/545 |
| 2014/0285476 A1 | 9/2014 | Cho et al. | |
| 2015/0077323 A1* | 3/2015 | Ramaswamy | G06F 3/012 345/156 |
| 2015/0116362 A1* | 4/2015 | Aurongzeb | G06F 3/1446 345/650 |
| 2015/0116364 A1* | 4/2015 | Aurongzeb | G06F 3/0487 345/659 |
| 2015/0324002 A1 | 11/2015 | Quiet et al. | |
| 2015/0350628 A1* | 12/2015 | Sanders | G06T 15/08 345/419 |
| 2016/0048222 A1 | 2/2016 | Sirpal et al. | |
| 2016/0062591 A1* | 3/2016 | Hwang | G06F 1/1694 345/173 |
| 2016/0062636 A1* | 3/2016 | Jung | G06F 3/04883 715/762 |
| 2016/0180578 A1* | 6/2016 | Vegesna | G06T 11/206 345/419 |
| 2016/0246470 A1 | 8/2016 | Doi et al. | |

* cited by examiner

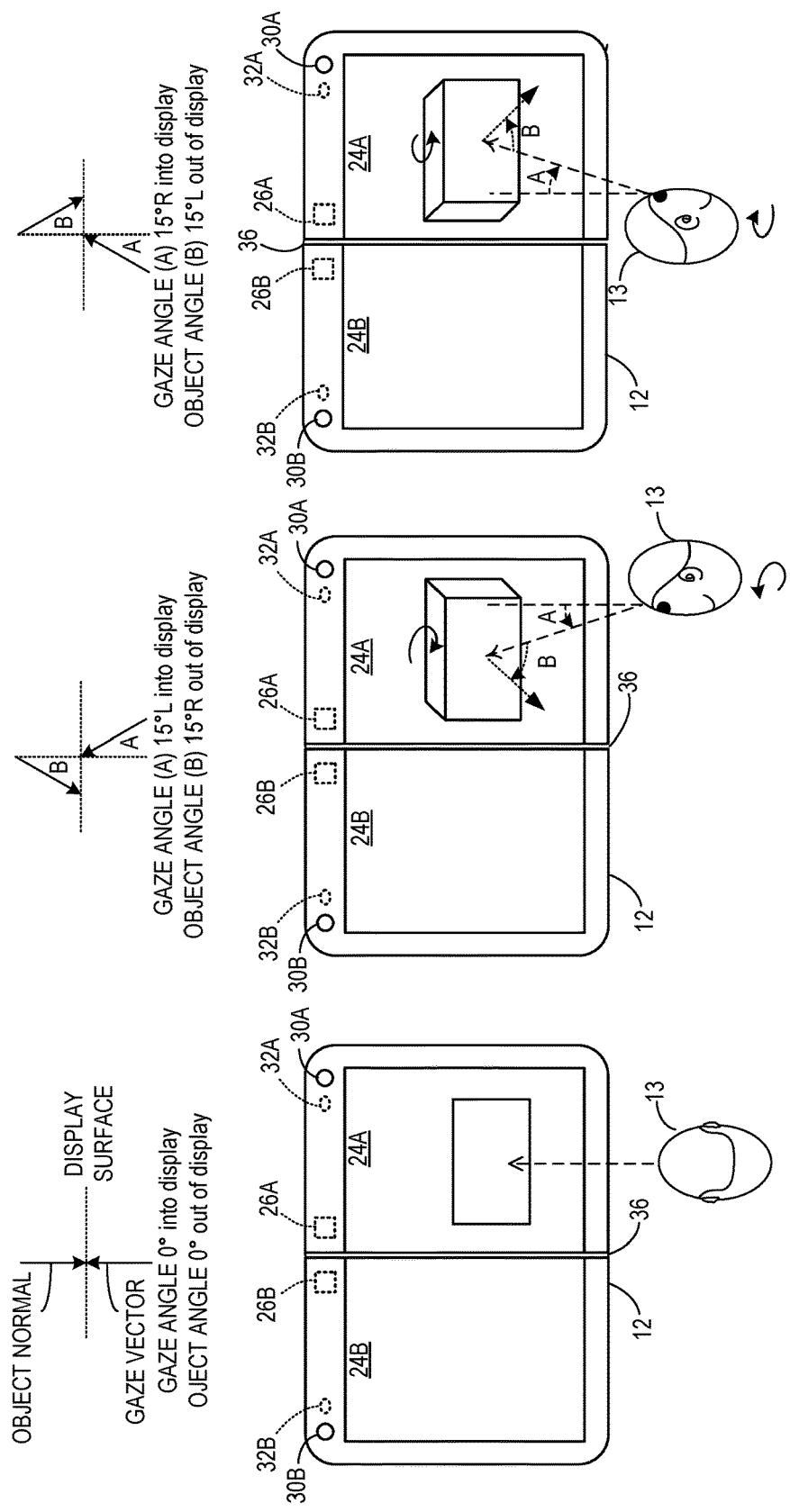

30 15 0 15 30 Gaze Angles
B  L  F  R  B   Views

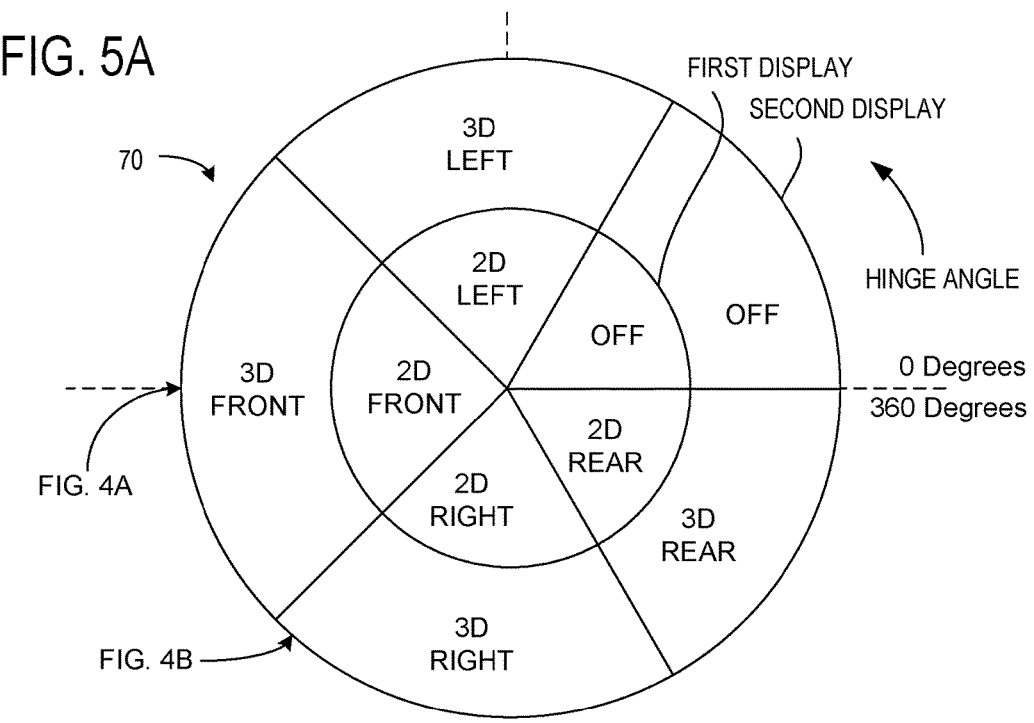
FIRST EXAMPLE MAP OF HINGE ANGLE TO VIEWS DISPLAYED ON EACH DISPLAY
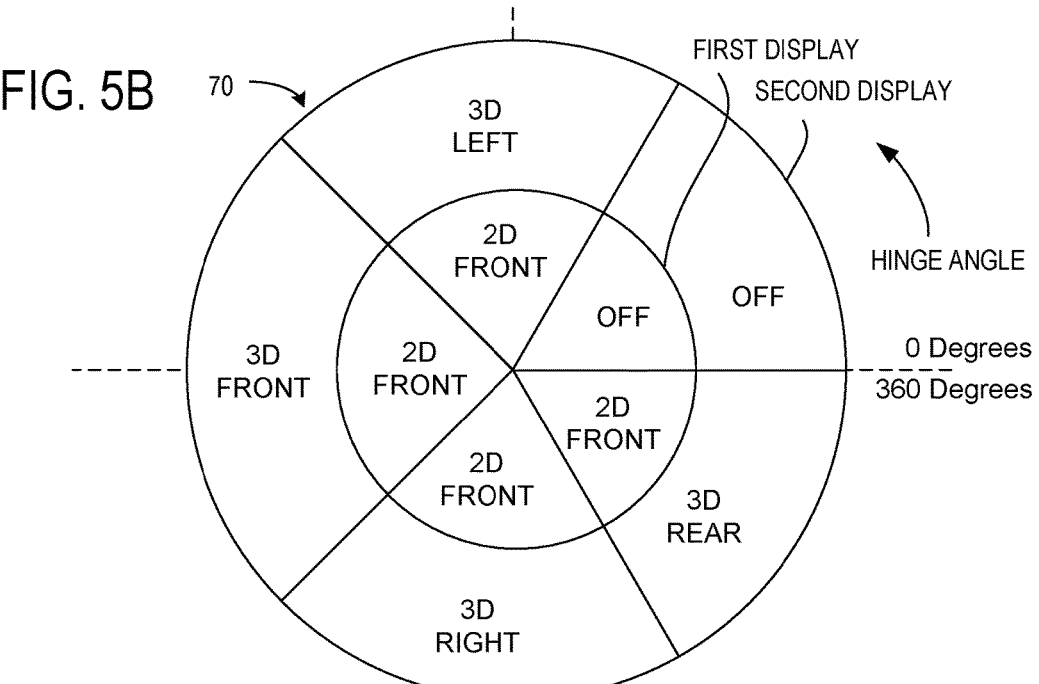
SECOND EXAMPLE MAP OF HINGE ANGLE TO VIEWS DISPLAYED ON EACH DISPLAY

THIRD EXAMPLE MAP OF HINGE ANGLE TO VIEWS DISPLAYED ON EACH DISPLAY

MANIPULATING VIRTUAL OBJECTS ON HINGED MULTI-SCREEN DEVICE

CROSS REFERENCE TO RELATED APPLICATIONS

This application claims priority to U.S. Provisional Patent Application No. 62/506,492, filed on May 15, 2017, the entirety of which is hereby incorporated herein by reference.

BACKGROUND

Users interact with multi-screen mobile devices throughout a variety of positions, including holding the device vertically, holding the device with a primary screen facing toward the user, holding the screen with a second screen facing toward the user, and other positions and orientations. However, users may encounter difficulties manipulating virtual three-dimensional objects on the two-dimensional screens. Conventional methods employ an external input device, such as a mouse, to manipulate virtual three-dimensional objects on two-dimensional display screens, which may be cumbersome and inconvenient for users.

SUMMARY

To address the above issues, a mobile computing device is provided. The mobile computing device comprises a housing having a first part and a second part coupled by a hinge, the first part including a first display and a second part including a second display, a sensor mounted in the housing and configured to detect a hinge angle between the first and second parts of the housing, and a processor mounted in the housing. The processor is configured render and cause to be displayed on a display a two-dimensional view of a virtual object on the first display, and a three-dimensional view of the virtual object on the second display. The three-dimensional view of the virtual object is rendered based on the detected hinge angle between the first and second parts of the housing.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 3A-C show an illustration of the rendering and display of a three-dimensional view of a virtual object on a display of the mobile computing device of FIG. 1, the perspective of the three-dimensional view being adjusted based on a detected gaze angle of the user.

In FIGS. 4A-C the perspective of the three-dimensional view is adjusted based on the detected hinge angle, and in FIG. 4D, the three-dimensional view is adjusted based on the detected hinge angle and also based on the detected gaze angle of the user.

FIGS. 5A and 5B show first and second example maps of hinge angle corresponding to views displayed on each display of the mobile computing device of FIG. 1.

DETAILED DESCRIPTION

As discussed above, conventional methods for manipulating representations of three-dimensional virtual objects and scenes may be cumbersome and inconvenient for users of mobile computing devices. The systems and methods described herein have been devised to address these challenges.

Figure 1:
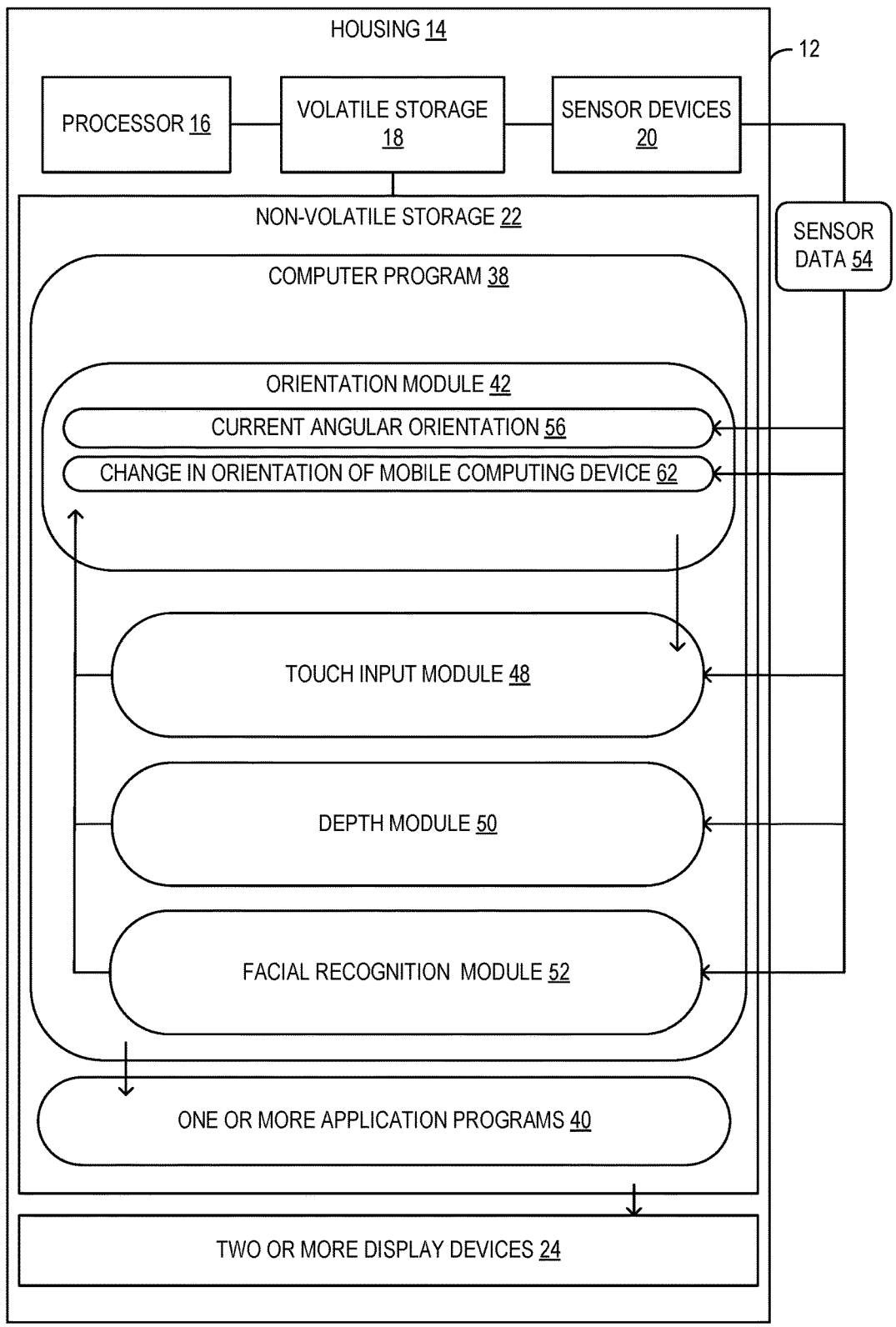
FIG. 1 shows an example mobile computing device of the present description.

FIG. 1 illustrates a mobile computing device 12 that includes a housing 14, which, for example, may take the form of a casing surrounding internal electronics and providing structure for displays, sensors, speakers, buttons, etc. The housing 14 is configured to include a processor 16, volatile storage device 18, sensor devices 20, non-volatile storage device 22, and two or more display devices 24.

The mobile computing device 12 may, for example, take the form of a smart phone device. In another example, the mobile computing device 12 may take other suitable forms, such as a tablet computing device, a wrist mounted computing device, etc.

Figure 2A:
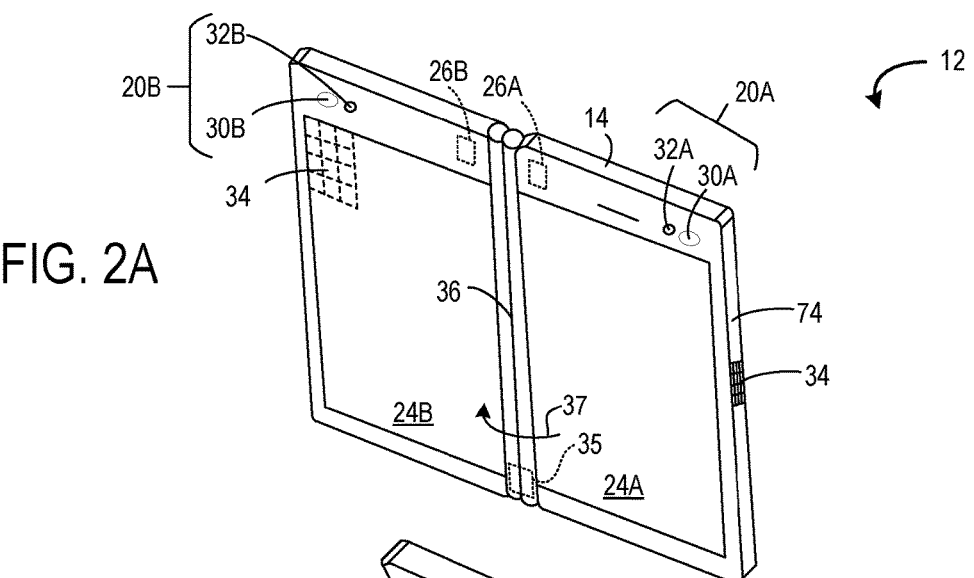
FIG. 2A shows an example of two display screens arranged in a side-by-side orientation for the mobile computing device of FIG. 1.

Turning to FIG. 2A, an example mobile computing device 12 is illustrated. As shown, the example mobile computing device 12 includes a housing 14. As discussed above, the housing 14 may be configured to internally house various electronic components of the example mobile computing device 12, including the processor 16, volatile storage device 18, and non-volatile storage device 22. Additionally, the housing 14 may provide structural support for the display devices 24 and the sensor devices 20. The sensor devices 20 may include a plurality of different sensors, such as, for example, a hinge angle sensor 35 coupled to hinge 36, inertial measurement units 26A and 26B, forward facing cameras 30A and 30B, depth cameras 32A and 32B, etc. The hinge angle sensor 35 is configured to measure a hinge angle 37 between emissive faces of the displays 24A and 24B. The cameras are not particularly limited and may comprise a time of flight (TOF) three-dimensional camera, a stereoscopic camera, and/or picture cameras. The inertial measurement units 26A and 26B may include accelerometers, gyroscopes, and possibly magnometers configured to measure the position of the mobile computing device 12 in six degrees of freedom, namely x, y, z, pitch, roll and yaw, as well as accelerations and rotational velocities, so as to track the rotational and translational motion of the mobile computing device 12. The sensor devices 20 may also include a capacitive touch sensor 34, such as a capacitive array that is integrated with each of the two or more display devices 24. In another example, the sensor devices 20 may include camera-in-pixel sensors that are integrated with each of the two or more display devices 24. It will be appreciated that the examples listed above are exemplary, and that other types of sensors not specifically mentioned above may also be included in the sensor devices 20 of the mobile computing device 12. In the illustrated example, the sensor devices 20 include two or more inertial measurement units 26A and 26B that are contained by the housing 14. The sensor devices 20 may further include forward facing cameras 30A and 30B. In one example, the forward-facing cameras 30A and 30B include RGB cameras. However, it will be appreciated that other types of cameras may also be included in the forward-facing cameras 30. In this example, forward facing is a direction of the camera's associated display device. Thus, in the example of FIG. 2A, as the screens for both of an example pair of display devices 24A and 24B are facing the same direction, both of the forward-facing cameras 30A and 30B are also facing the same direction. The sensor devices 20 may further include depth cameras 32A and 32B.

As shown, the sensor devices 20 may also include capacitive touch sensors 34 that are integrated with the pair of display devices 24A and 24B, as well as other additional displays. In the illustrated embodiment, the capacitive touch sensors 34 include a capacitive grid configured to sense changes in capacitance caused by objects on or near the display devices, such as a user's finger, hand, stylus, etc. In one embodiment, the capacitive touch sensors 34 may also be included on one or more sides of the mobile computing device 12. For example, the capacitive touch sensors 34 may be additionally integrated into the sides of the housing 14 of the mobile computing device 12. While the capacitive touch sensors 34 are illustrated in a capacitive grid configuration, it will be appreciated that other types of capacitive touch sensors and configurations may also be used, such as, for example, a capacitive diamond configuration. In other examples, the sensor devices 20 may include camera-in-pixel devices integrated with each display device including the pair of display devices 24A and 24B. It will be appreciated that the sensor devices 20 may include other sensors not illustrated in FIG. 2A.

In the example mobile computing device 12 illustrated in FIG. 2A, the two example display devices 24A and 24B are movable relative to each other. As shown, the example mobile computing device 12 includes a housing 14 including the processor 16, the inertial measurement units 26A and 26B, and the two or more display devices 24, the housing including a hinge 36 between a pair of display devices 24A and 24B of the two or more display devices 24, the hinge 36 being configured to permit the pair of display devices 24A and 24B to rotate between angular orientations from a face-to-face angular orientation to a back-to-back angular orientation.

Figure 2B:
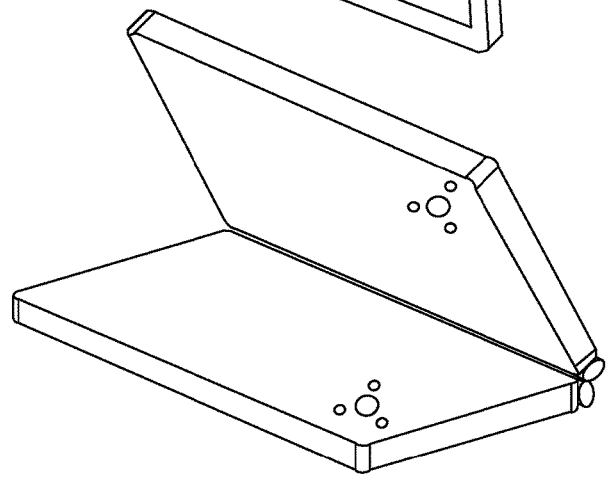
FIG. 2B shows an example of two display screens arranged in a reflex orientation for the mobile computing device of FIG. 1.

Now turning to FIG. 2B, the hinge 36 permits the pair of display devices 24A and 24B to rotate relative to one another such that the hinge angle 37 between the pair of display devices 24A and 24B can be decreased or increased by the user via applying suitable force to the housing 14 of the mobile computing device 12. As shown in FIG. 2B, the pair of display devices 24A and 24B may be rotated until the pair of display devices 24A and 24B reach a back-to-back angular orientation as shown in FIG. 2C.

Figures 2C, 2D:
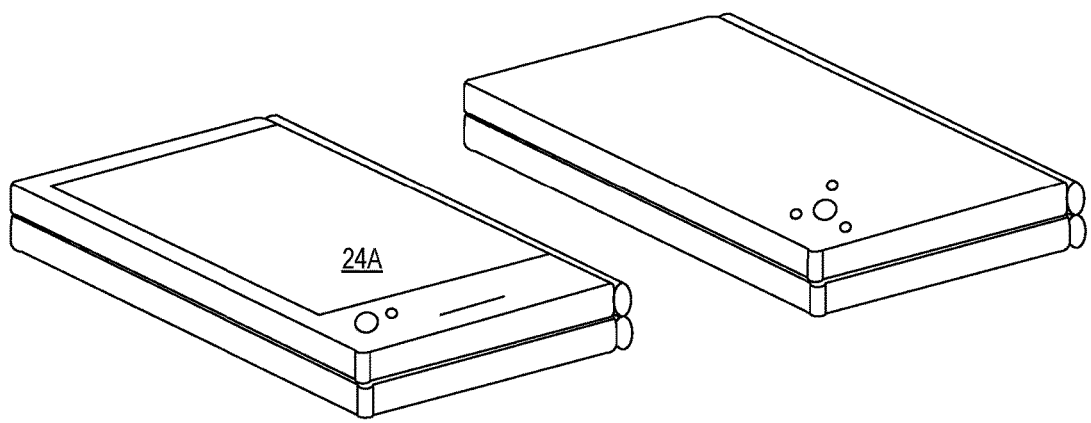
FIG. 2C shows an example of two display screens arranged in a back-to-back orientation for the mobile computing device of FIG. 1.
FIG. 2D shows an example of two display screens arranged in a front-to-front orientation for the mobile computing device of FIG. 1.

As illustrated in FIG. 2C, while in an angular orientation where the pair of display devices 24A and 24B are in a back-to-back angular orientation, the pair of display devices 24A and 24B face away from each other. Thus, while using the mobile computing device 12, the user may only be able to view one of the display devices of the pair of display devices 24A and 24B at a time. Additionally, while in a back-to-back angular orientation, sensor packages 20A and 20B of the sensor devices 20, which may each include forward facing cameras 30A and 30B, and depth cameras 32A and 32B, also face in the same direction as their respective display device, and thus also face away from each other.

As shown in FIG. 2D, the angular orientation between the pair of display devices 24A and 24B may also rotate to a face-to-face orientation where the pair of display devices face each other. Such an angular orientation may help protect the screens of the display devices.

Turning back to FIG. 1, the processor 16 is configured to execute a computer program, which, for example, may be an operating system or control program for the mobile computing device, and one or more application programs 40 stored on the non-volatile storage device 22, and to enact various control processes described herein. In some examples, the processor 16, volatile storage device 18, and non-volatile storage device 22 are included in a System-On-Chip configuration.

The computer program 38 executed by the processor 16 includes an orientation module 42, a touch input module 48, a depth module 50, and a face recognition module 52. As shown in FIG. 1, the orientation module 42 is configured to receive sensor data 54 from the sensor devices 20. Based on the sensor data 54, the orientation module 42 is configured to detect a current angular orientation 56 (e.g., hinge angle 37) between the pair of display devices 24A and 24B indicating that the pair of display devices 24A and 24B are facing away from each other. As discussed previously, the angular orientation between the pair of display devices 24A and 24B may rotate through angular orientations between a face-to-face angular orientation to a back-to-back angular orientation. In this manner, the orientation module 42 is configured to detect a current angular orientation 56 indicating that the pair of display devices 24A and 24B are facing away from each other, such as a back-to-back angular orientation.

The orientation module 42 may be configured to detect the current angular orientation 56 based on different types of sensor data. In one embodiment, the sensor data 54 may include inertial measurement unit data received via the inertial measurement units 26A and 26B. As the user applies force to the housing 14 of the mobile computing device 12 to rotate the pair of display devices 24A and 24B, the inertial measurement units 26A and 26B will detect the resulting movement. Thus, based on inertial measurement unit data for a new rotation and a previously known angular orientation between the pair of the display devices 24A and 24B, the orientation module 42 may calculate a new current angular orientation 56 resulting after the user rotates the pair of display devices 24A and 24B. However, it will be appreciated that the current angular orientation 56 may also be calculated via other suitable methods. For example, the sensor devices 20 may include the hinge sensor 35 discussed above in the hinge 36 that is configured to detect the hinge angle 37 as the angular orientation 56 of the hinge 36, and thereby detect a current hinge angle 37 between the pair of display devices 24A and 24B around the pivot of hinge 36. In the depicted embodiment, the hinge sensor 35 is incorporated within the hinge 36 itself. However, it will be appreciated that the hinge sensor 35 may alternatively be provided outside of the hinge 36.

With reference to FIGS. 3A-C, an illustration of the rendering and display of a three-dimensional view of a virtual object with the perspective adjusted based on a gaze angle of the user, will now be described. In this gaze tracking example, cameras are used to estimate a gaze angle of a user which is used by the processor 16 to render and display the three-dimensional view of the virtual object in a perspective that is adjusted based upon the detected gaze angle. As shown in FIG. 3A, a user 13 may be gazing at an virtual object displayed by a display device 24A of the mobile computing device 12. The image of the virtual object displayed on the display device 24A may be received from at least one of the cameras 30A and 30B, or the image may be any content already stored on the mobile computing device 12 or remotely stored in another device, server, or network, for example. Using three-dimensional gaze tracking to estimate the current gaze angle of the user, spatially separated cameras 30A and 30B capture image data in a field of vision of the cameras. One of the cameras 30A and 30B may be aligned with the right eye of the user 13, while the other one of the cameras 30A and 30B may be aligned with the left eye of the user. The captured image data is processed to identify and locate eye and fiducial features and determine spatial coordinates to the features responsive to distances to the features determined from parallax that they exhibit in the captured image data. This method is also known as the binocular parallax (stereopsis) method of three-dimensional gaze tracking. In the example configuration of FIG. 3A, based on inputs from the forward-facing cameras 30A and 30B, and the inertial measurement units 26A and 26B, the application 40 estimates that the current gaze angle of the user 13 is 0 degrees. That is, the application 40 estimates that the user 13 is staring straight ahead at the display device 24A. Accordingly, the application 40 renders and causes to be displayed the virtual object on the display 24A in a two-dimensional view, with an object angle at 0 degrees.

Turning to FIG. 3B, the user 13 keeps gazing at the image, but turns her head to the left so that the gaze angle of the user relative to display device 24B is 15 degrees to the left. Alternatively, the user 13 may have turned the mobile computing device to the right to achieve the same gaze angle relative to the display device 24B. Based on inputs from the forward-facing cameras 30A and 30B, and the inertial measurement units 26A and 26B, the application 40 estimates that the current gaze angle of the user 13 is 15 degrees to the left. Accordingly, the application 40 renders and displays the virtual object on the display 24B in a three-dimensional view that corresponds to the user's current gaze angle. In the depicted example, the gaze angle is 15 degrees left into the display, and the object is rendered with a normal vector from a front surface of the object that is at 15 degrees to the right out of the page. In this way, the user can peer around a first side of the object by turning her head and adjusting her gaze angle.

Turning to FIG. 3C, likewise, the user 13 keeps gazing at the virtual object, but turns her head to the right so that the gaze angle of the user relative to display device 24A is 15 degrees to the right. Alternatively, the user 13 may have turned the mobile computing device to the left to achieve the same gaze angle relative to the display device 24A. Based on inputs from the forward-facing cameras 30A and 30B, and the inertial measurement units 26A and 26B, the application 40 estimates that the current gaze angle of the user 13 is 15 degrees to the right. Accordingly, the application 40 renders and displays the virtual object on the display 24B in a three-dimensional view that corresponds to the user's current gaze angle. In the depicted example, the gaze angle is 15 degrees right into the display, and the object is rendered with an object angle at 15 degrees left out of the display. In this way, the user can peer around the other side of the object by turning her head the other way.

Alternatively, when only one of the two cameras 30A and 30B is within the field of view of the user 13, three-dimensional tracking may substitute binocular parallax methods for alternative methods of gaze tracking using the inertial measurement units 26A and 26B, depth cameras 32A and 32B, and/or hinge sensor 36, for example. For example, distances may also be determined from the speed of light and round-trip times. Three-dimensional gaze tracking may also detect faces within the field of view of the cameras 30A and 30B.

Figure 4A:
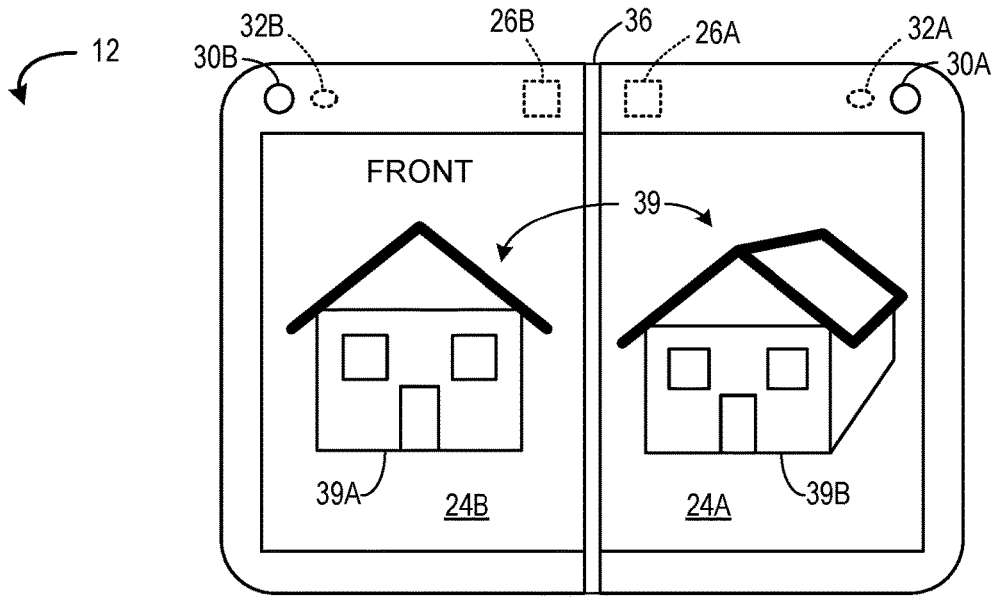
FIGS. 4A-D show an illustration of the rendering and display of a two-dimensional view of an virtual object on a first display and a three-dimensional view of the virtual object on a second display of the mobile computing device of FIG. 1.
Figure 4B:
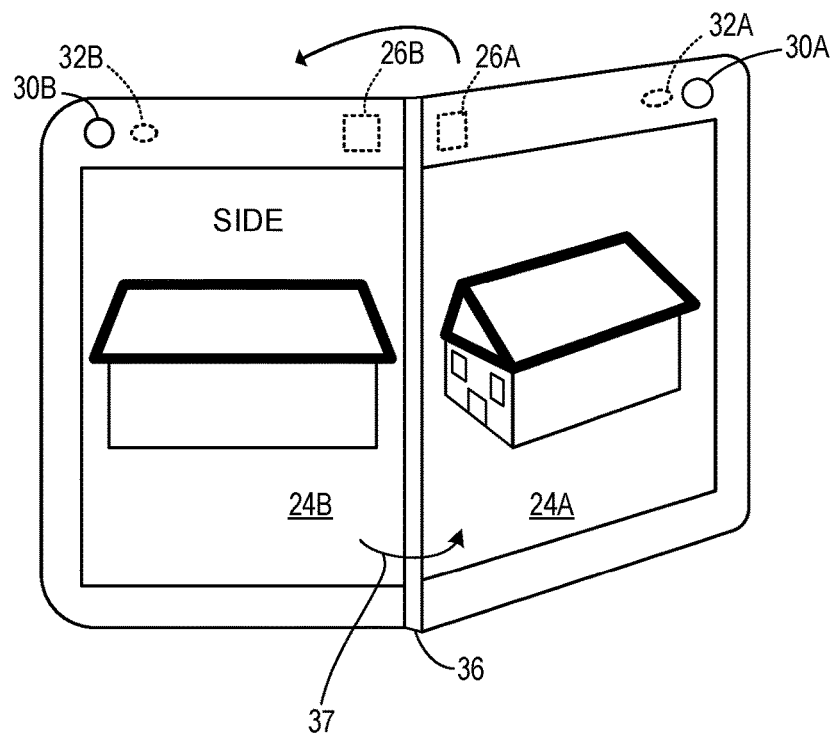
Figures 4C, 4D:
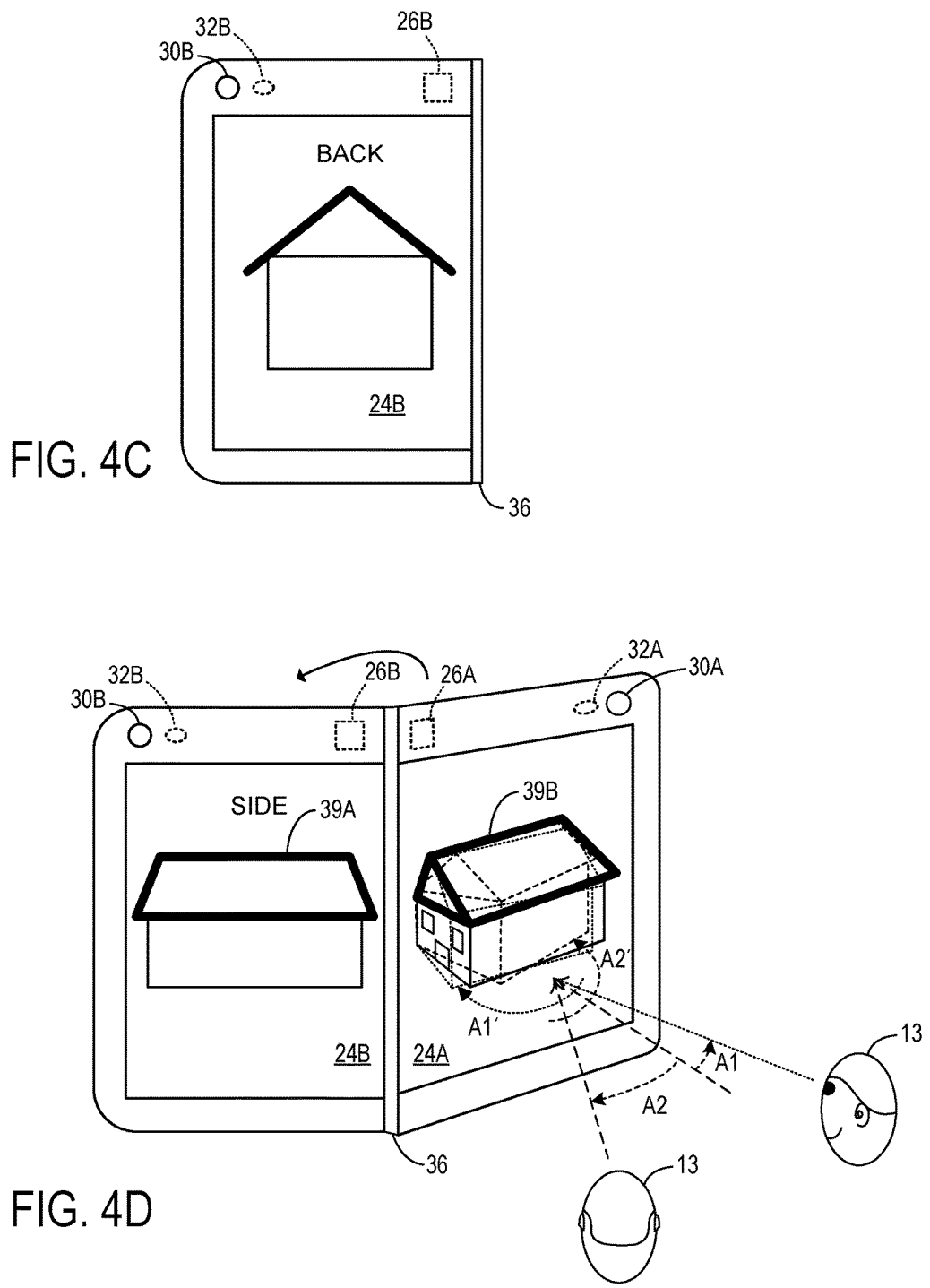

With reference to FIGS. 4A-C, another example use case illustrating aspects of the present disclosure will now be presented, which may be utilized independently or combined with the techniques illustrated in FIGS. 3A-C. FIG. 4A illustrates that the processor 16 of the mobile computing device may be configured to render and cause display of a two-dimensional view 39A of a virtual object 39 on the display 24B and a three-dimensional view 39B of the virtual object 39 on the display 24A. As illustrated, the virtual object 39 is a rendering of a house. The views of the virtual object 39 are selected based upon a view map 70 which relates the detected hinge angle to the views to be shown in each of displays 24A and 24B, and examples of the view maps 70 are shown in FIGS. 5A and 5B, discussed below.

The mobile computing device 12 is configured to dedicate display 24B as the display window to display the two-dimensional view of the virtual object, while display 24A is dedicated as the display window to render and display a three-dimensional view of the virtual object. Thus, it will be appreciated these views may be exclusive to each display. Accordingly, display 24B may be configured to display only a two-dimensional view of the scene or object and not a three-dimensional view of the scene or object among possible views of the scene or object, and display 24A may be configured to display only the three-dimensional view of the scene or object and not a two-dimensional view of the scene or object among possible views of the scene or object. In this manner, a user may conveniently view a two-dimensional view and a three-dimensional view of the same virtual scene or virtual object side-by-side on a hinged display device, which may be useful in many applications, for example in modelling three-dimensional objects for design and manipulation, rendering navigational maps in multiple views, and rendering cross-sectional views of multiple radiological images of the human anatomy, for example.

As most clearly illustrated in FIG. 4B, the three-dimensional view of the virtual object is rendered based on the detected hinge angle 37 between the first and second parts of the housing. From the device pose shown in FIG. 4A, the user may start rotating the right display 24A so that the hinge angle 37 is widened a few degrees between display 24A and 24B. In response, the processor renders and causes the right display 24A to display a three-dimensional view of the virtual object which is generated based on the hinge angle 37. That is, the rendering of the three-dimensional view of the virtual object is based upon the detected hinge angle 37 between the first and second parts of the housing. As the hinge angle 37 between the first and second parts of the housing 14 changes from the position in FIG. 4A to that in FIG. 4B, the change in the hinge angle 37 is sensed by a sensor 20 such as hinge angle sensor 35 and/or IMUs 26A, 26B, and the rendering of the three-dimensional view of the virtual object is adjusted based on the change in the detected hinge angle 37. In other words, the perspective of the three-dimensional view of the virtual object is adjusted based on the change in the detected hinge angle 37.

The processor 16 is configured to render the three-dimensional view according to a map 70 that relates a detected hinge angle 37 to a type of three-dimensional view 39B to be displayed on the second display. FIG. 5A shows an example map 70. In map 70 of FIG. 5A, the type of three-dimensional view related by the map to hinge angle is a type of perspective from which the three-dimensional view of the virtual object 39 is taken, such as a left, right, front, rear, top, or bottom three-dimensional view). Map 70 further relates the detected hinge 37 angle to a type of two-dimensional view to be displayed on the first display. The type of two-dimensional view may also be a perspective from which the two-dimensional view is taken, such as a left, right, front, rear, top, or bottom two-dimensional view.

The processor 16 may be configured to render the perspective of the three-dimensional view 39B when the detected hinge angle 37 equals a predetermined hinge angle or is within a predetermined hinge angle range, as discussed below. This predetermined range may be a range contained within map 70 for example. For example, the predetermined range triggered by the hinge angle of FIG. 4B, is the range shown in FIG. 5A that is greater than 225 degrees but less than 300 degrees, and in which the first display 24A displays a two-dimensional right-side view, and the second display 24B displays a three-dimensional right-side view. Other predetermined ranges within this map are described as follows:
0-60 degrees: both displays off
60-135 degrees: first display displays two-dimensional left side view, second display displays three-dimensional left side view
135-225 degrees: first display displays two-dimensional front view, second display displays three-dimensional front view
225-300 degrees: first display displays two-dimensional right-side view, second display displays three-dimensional right-side view
300-360 degrees: first display displays two-dimensional rear view, second display displays three-dimensional rear view Using the map 70 of FIG. 5A, the left display 24B may be configured to change a two-dimensional view of the house depending on the current hinge angle. For example, the left display 24B may be configured to change from displaying a front of the house as shown in FIG. 4A to displaying a side view of the house as shown in FIG. 4B, when the current hinge angle is detected to be within a predetermined hinge angle range of map 70, such as within 60 to 135 degrees. Other similar transitions are contemplated using the ranges specified above.

In an additional or alternative implementation, the user's gaze angle A relative to display 24B may be estimated, and this gaze angle may be used to alter the two-dimensional view presented in display 24B. For example, the user may move his head back and forth from 90 degrees to the right to 90 degrees to the left, and pass through the following ranges, which may cause the views listed below to be displayed as follows.
90>A>30 degrees to the left: 2D back view (B) shown;
30>A>15 degrees to the left: 2D left view (L) shown;
15 to the left>A>15 degrees to the right: front (F) view shown;
30>A>15 degrees to the right: 2D right (R) view shown; and
90>A>30 degrees to the right: 2D back (B) view shown.

Turning now to FIG. 5B, according to the map 70 shown in this Figure, the display 24B may continue to display a particular two-dimensional view 39A, such as a front view, or other two-dimensional view on the display 24B, while the hinge angle 37 is used to alter only the perspective of the three-dimensional view 39B displayed on the display 24A. According to this map 70 of FIG. 5B, the following exemplary hinge angle ranges are defined:
0-60 degrees: both displays off;
60-135 degrees: first display displays two-dimensional front view, second display displays three-dimensional left side view;
135-225 degrees: first display displays two-dimensional front view, second display displays three-dimensional front view;
225-300 degrees: first display displays two-dimensional front view, second display displays three-dimensional right-side view; and
300-360 degrees: first display displays two-dimensional front view, second display displays three-dimensional rear view.

Although not illustrated in this manner, the map 70 of FIG. 5B would result in a two-dimensional front view being retained in display 24B during the transition from FIG. 4A to 4B, while display 24A would transition in the same manner illustrated in those Figures.

Turning now to FIG. 4C, the right display 24A may be rotated until the mobile computing device 12 is in a back-to-back angular orientation, as illustrated. In such a case, the right display 24A may depict a front side of the house virtual object, while the left display 24B depicts a back side of the house virtual object, if the map 70 of FIG. 5B is applied. Note, the hinge angle in the back-to-back orientation is near to 360 degrees, and thus within the 300 to 360 degree range listed above.

With reference to FIG. 4D, it will be appreciated that the three-dimensional view may be further modified based upon the detected gaze angle of the user, in addition to the detected hinge angle 37. In this example, the current hinge angle 37 sensed by the hinge angle sensor 35 or IMUs 26A, 26B is used to determine the perspective of the three-dimensional view of the virtual object, and the estimated gaze angle of the user is used to adjust the perspective of the three-dimensional view. In this way, the user may turn his head to the right or left to adjust the gaze of the user and thereby virtually peek around the left or right side of the displayed object. To achieve this, the processor 16 may be configured to process image data captured of a user by the first and second cameras, and estimate a current gaze vector of the user relative to the first and second displays, based on the image data captured by the first and second cameras and the detected hinge angle 37, and as the current gaze vector changes, adjust the display of the three-dimensional view of the virtual object based on the change in the current gaze vector, in addition to adjustment of the three-dimensional view based on the detected hinge angle. In FIG. 4D, as the user moves his gaze toward the left at A1, the three-dimensional virtual object 39B is rotated in the opposite direction, to the right, as shown in dotted lines. In contrast, when the user rotates his head to the right at A2, the virtual object rotates in the opposite direction to the left as shown in dashed lines. In this way, the user can adjust his gaze to see different perspectives of the three-dimensional view 39B of the virtual object.

Figure 6A:
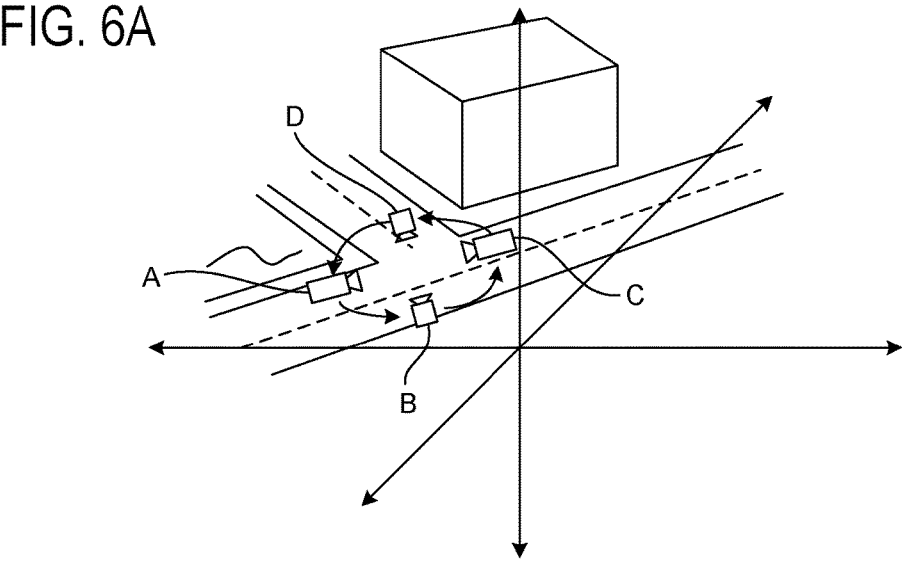
FIG. 6A shows a three-dimensional virtual environment and virtual cameras positioned therein, from which views are captured to be presented on each of the displays of the mobile computing device of FIG. 1.
Figure 6B:
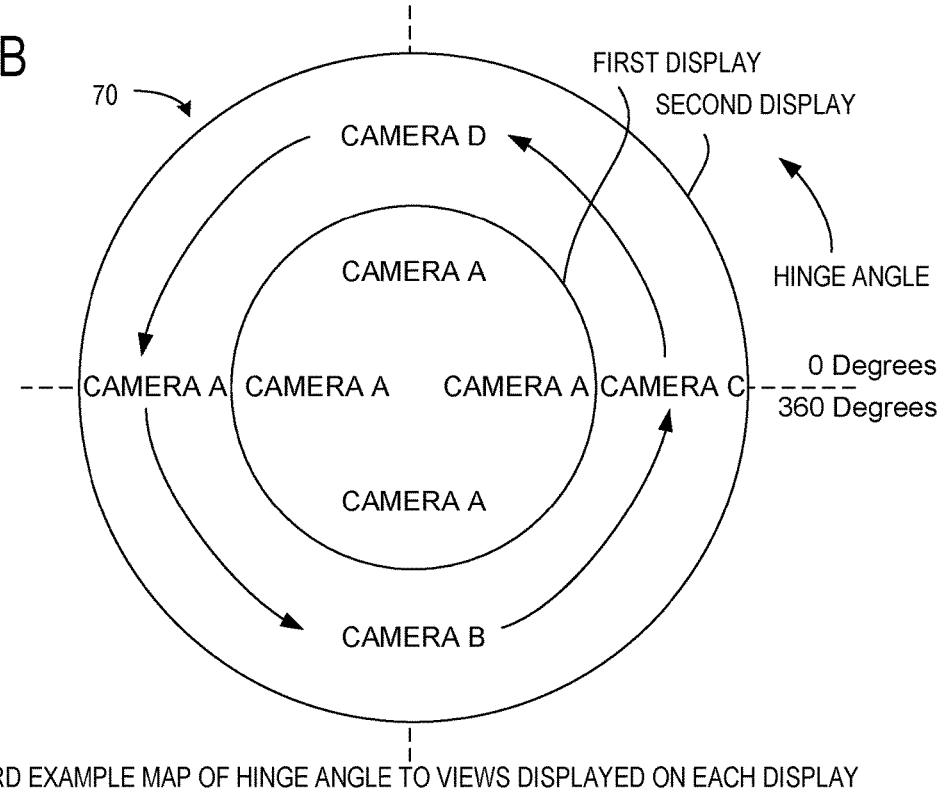
FIG. 6B is a map showing a relationship between a detected hinge angle of the mobile computing device of FIG. 1 and the differing camera views of the three-dimensional virtual environment of FIG. 6A displayed on each display of the device.

Turning now to FIGS. 6A and 6B, FIG. 6A shows a three-dimensional virtual environment, with various virtual cameras A-D positioned therein. In the depicted embodiment, the virtual cameras are shown positioned with lines of sight that point at and across each other. It will be appreciated that while four discrete cameras are shown on a circular camera track, a larger number of discrete cameras could be defined along this track, and the track could be defined to be other than circular.

As a user of mobile computing device 12 views the three-dimensional virtual environment shown in FIG. 6A, one of the virtual cameras, such as camera A, is typically mapped to display 24A, and the other display has mapped to it another camera selected from cameras positioned along the camera track, based on the detected hinge angle of the device. In this implementation, the type of three-dimensional view that is selected based on hinge angle is a virtual camera angle that captures a view of a three-dimensional virtual environment. Likewise, the type of two-dimensional view that is selected is a virtual camera angle that captures a view of a three-dimensional virtual environment.

In this example, the processor 16 is configured to render and cause to be displayed a three-dimensional view of a virtual environment from the point of view of a first virtual camera on display 24A and a three-dimensional view of a virtual environment from the point of view of a second camera on display 24B. The orientation of the first camera and second camera within the virtual environment is determined based upon the detected hinge angle. One way that this can be achieved is by using the map 70 of FIG. 6B. According to map 70 of FIG. 6B, when the hinge angle is between zero and 45 degrees, display 24A displays images from camera A, while display 24B displays images from camera C. When the hinge angle is between 45 and 135 degrees, display 24A displays images from camera A, while display 24B displays images from camera D. When the hinge angle is between 135 and 225 degrees, display 24A displays camera A while display 24B displays camera A as well. When the hinge angle is between 225 and 315 degrees, display 24A displays camera A and display 24 B displays camera B as well. For hinge angles greater than 315 degrees, the display 24A displays camera A and display 24B displays camera C. It will be appreciated that the number of cameras may be increased, for example, to 8, 16 or 32, and the images from each camera may be blended and interpolated to generate interstitial images between cameras. In this way, a user may hold up mobile computing device 12, and manipulate the displays to be at various hinge angles from each other, and while the user is manipulating these displays, three-dimensional views of the three-dimensional virtual environment that roughly correspond to the position of the displays 24A, 24B will be shown to the user, increasing the user's ease and flexibility of viewing the environment.

The virtual objects manipulated in the above examples represent a cube, a house, and a virtual map, but the nature of the virtual objects is not particularly limited and encompass any virtual object that can be rendered in both two dimensions and three dimensions on the flat display devices 24A and 24B. The three-dimensional renderings of the virtual objects may be rendered in real-time or pre-rendered as images to be retrieved upon demand. A continuous range of three-dimensional image renderings may be displayed for a continuous range of gaze angles, or only a select few three-dimensional perspective renderings of the virtual objects may be displayed for select gaze angle ranges.

Figure 7:
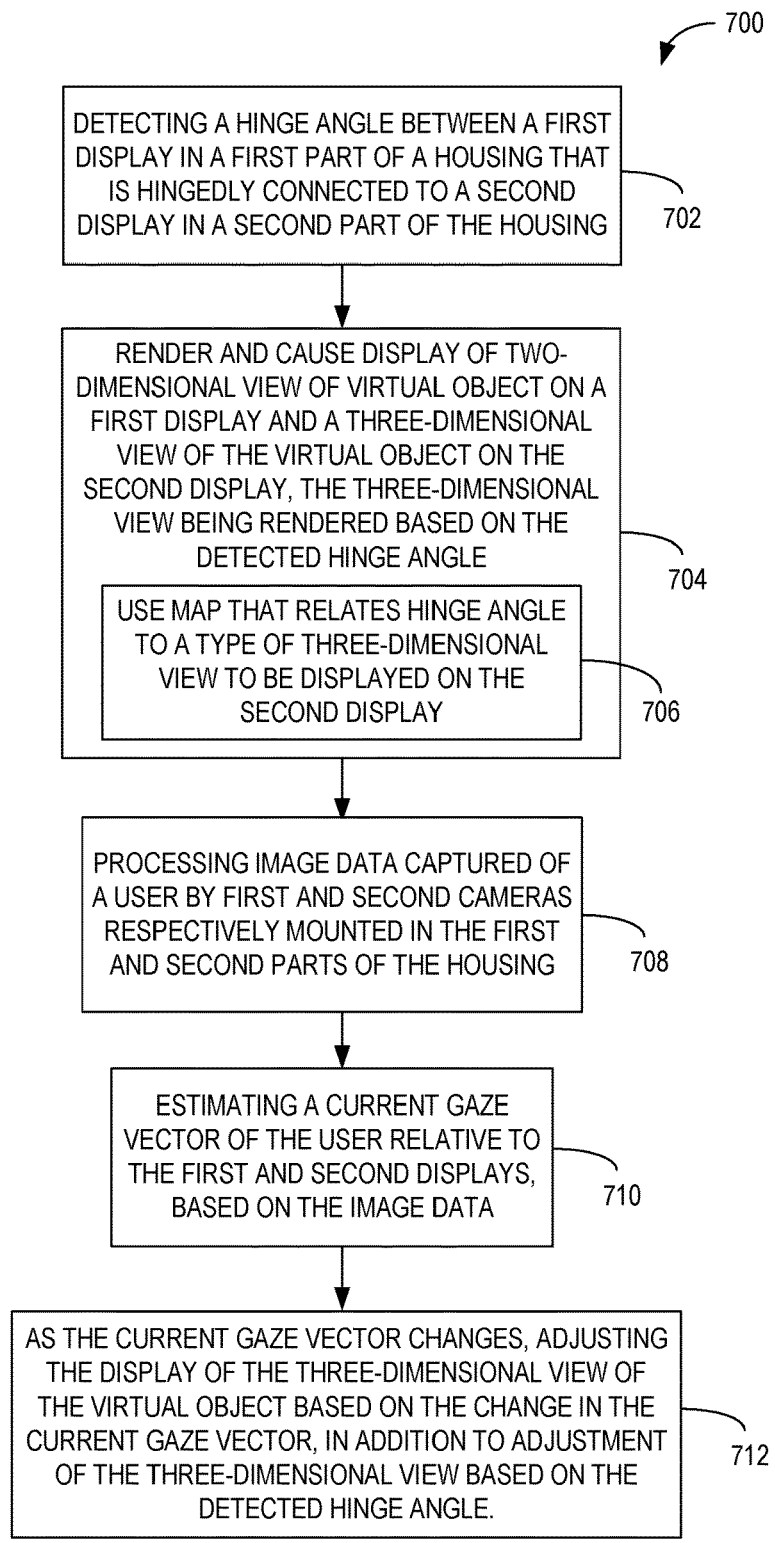
FIG. 7 is a flow chart for a method of displaying and manipulating virtual objects on a hinged multi-screen device according to an example of the present disclosure.

FIG. 7 illustrates a flow chart of a method 700 for displaying and manipulating virtual objects on a hinged multi-screen device according to an example of the present disclosure. The following description of method 700 is provided with reference to the software and hardware components described above and shown in FIGS. 1-6B. It will be appreciated that method 700 also may be performed in other contexts using other suitable hardware and software components. At 702, method 700 includes detecting a hinge angle between hinged displays. Typically, the hinge angle is detected via a hinge sensor 35 coupled to the hinge 36, but alternatively it could be detected using IMUs 26A, 26B, etc. At 704, the method includes rendering and causing to be displayed a two-dimensional view of a virtual object on the first display and a three-dimensional view of the virtual object on the second display, wherein the three-dimensional view of the virtual object is rendered based on the detected hinge angle between the first and second parts of the housing. At 706, the method includes using a map to accomplish the rendering of the three-dimensional view, the map relating the detected hinge angle to a type of three-dimensional view to be displayed on the second display. As discussed above, the type of three-dimensional view may be a perspective from which the three-dimensional view of the virtual object is taken. Alternatively, the type of three-dimensional view is a virtual camera angle that captures a view of a three-dimensional virtual environment. As discussed above, the map may further relate the detected hinge angle to a type of two-dimensional view to be displayed on the first display, and the two-dimensional view may be a perspective from which the two-dimensional view of the virtual object is taken. As discussed above in relation to FIG. 4A, the two-dimensional view may be selected based on a detected gaze angle, and the two-dimensional view and three-dimensional view of the virtual object may be configured to be manipulated by touch on the displays by a user.

At 708, the method includes processing image data captured of a user by first and second cameras respectively mounted in the first and second parts of the housing. At 710, the method includes estimating a current gaze vector of the user relative to the first and second displays, based on the image data captured by the first and second cameras and the detected hinge angle. And, at 712, the method includes, as the current gaze vector changes, adjusting the display of the three-dimensional view of the virtual object based on the change in the current gaze vector, in addition to adjustment of the three-dimensional view based on the detected hinge angle.

Figure 8:
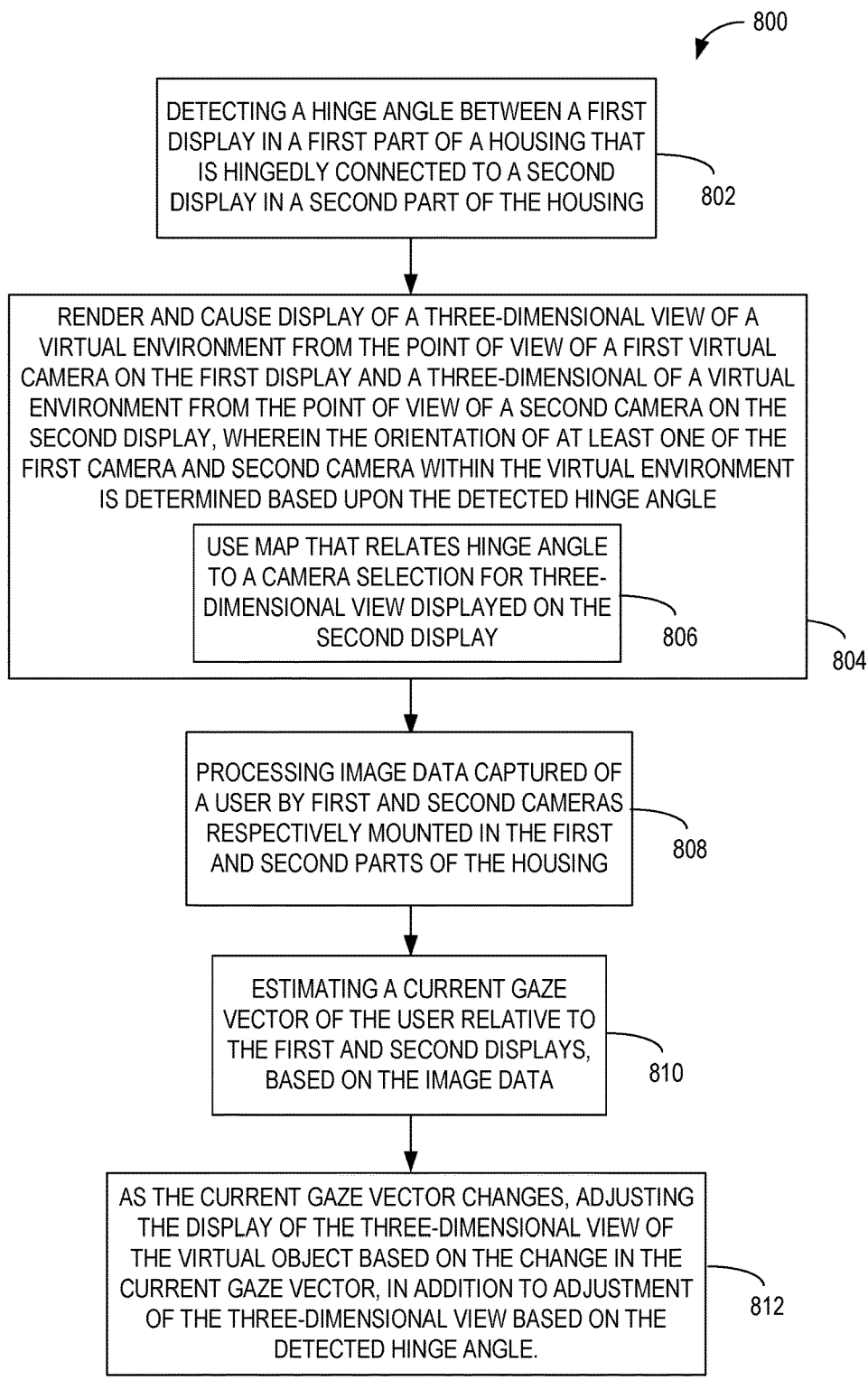
FIG. 8 is another flow chart for a method of displaying and manipulating virtual objects on a hinged multi-screen device according to another example of the present disclosure.

Turning now to FIG. 8, a method 800 according to another implementation of the present disclosure is illustrated. Steps 802, 808, 810, and 812 are similar to 702, 708, 710, and 712, and will not be redescribed for the sake of brevity. At step 804, the method includes rendering and causing display of a three-dimensional view of a virtual environment from the point of view of a first virtual camera on the first display and a three-dimensional of a virtual environment from the point of view of a second camera on the second display, wherein the orientation of at least one of the first camera and the second camera within the virtual environment is determined based upon the detected hinge angle. To achieve this rendering, at 806, the method includes using a map that relates hinge angle to a camera selection of a three-dimensional view to be displayed on the second display. One example mapping that may be used to implement step 806 is illustrated in FIG. 6B.

The above described systems and methods may be implemented to afford users a convenient and flexible interface for viewing two-dimensional and three-dimensional views of virtual objects, which is easily controllable based on hinge angle between two hinged displays, and which in some implementations also intuitively controls the display of the views based on a user's gaze.

Figure 9:
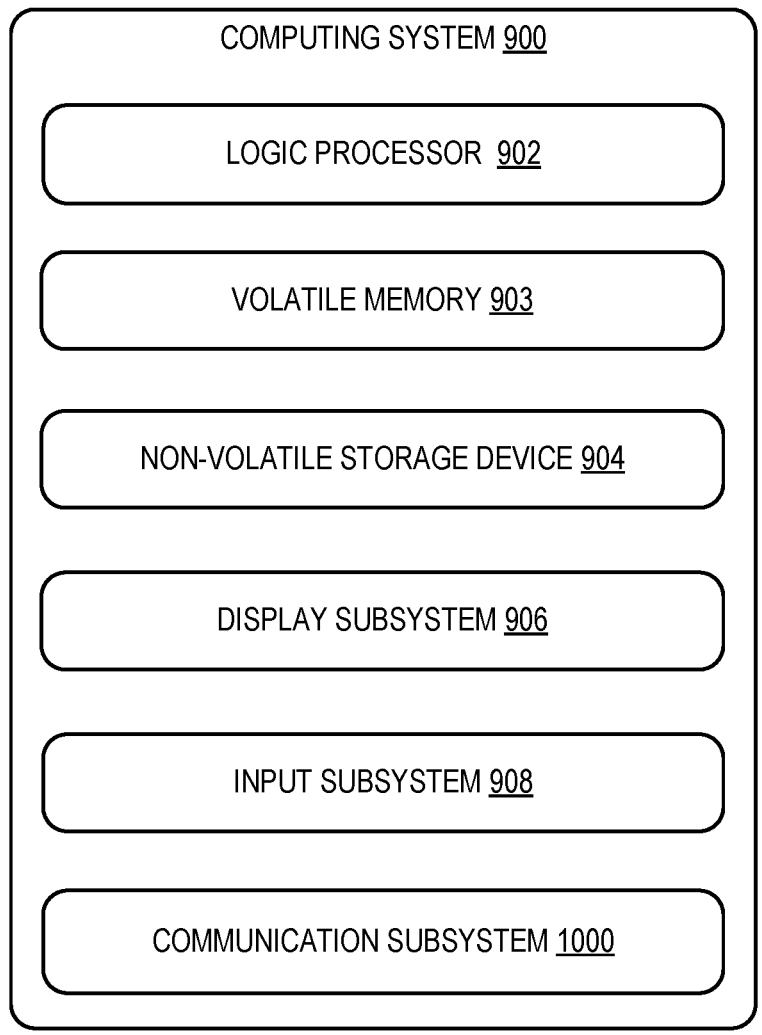
FIG. 9 shows an example computing system according to an embodiment of the present description.

FIG. 9 schematically shows a non-limiting embodiment of a computing system 900 that can enact one or more of the methods and processes described above. Computing system 900 is shown in simplified form. Computing system 900 may embody the mobile computing device 12 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, inertial measurement unit, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a mobile computing device comprising a housing having a first part and a second part coupled by a hinge, the first part including a first display and the second part including a second display; a sensor mounted in the housing and configured to detect a hinge angle between the first and second parts of the housing; and a processor mounted in the housing, the processor being configured to render and cause to be displayed on a display a two-dimensional view of a virtual object on the first display and a three-dimensional view of the virtual object on the second display, and the three-dimensional view of the virtual object being rendered based on the detected hinge angle between the first and second parts of the housing. In this aspect, additionally or alternatively, the processor may be configured to render the three-dimensional view according to a map that relates the detected hinge angle to a type of three-dimensional view to be displayed on the second display. In this aspect, additionally or alternatively, the type of three-dimensional view may be a perspective from which the three-dimensional view of the virtual object is taken. In this aspect, additionally or alternatively, the type of three-dimensional view may be a virtual camera angle that captures a view of a three-dimensional virtual environment. In this aspect, additionally or alternatively, the map may further relate the detected hinge angle to a type of two-dimensional view to be displayed on the first display. In this aspect, additionally or alternatively, the type of two-dimensional view may be a perspective from which the two-dimensional view of the virtual object is taken. In this aspect, additionally or alternatively, the two-dimensional view may be selected based on the detected gaze angle. In this aspect, additionally or alternatively, the two-dimensional view and the three-dimensional view of the virtual object may be configured to be manipulated by touch on the displays by a user. In this aspect, additionally or alternatively, the mobile computing device may further comprise a first camera mounted in the first part of the housing; and a second camera mounted in the second part of the housing, the processor being further configured to process image data captured of a user by the first and second cameras, and estimate a current gaze vector of the user relative to the first and second displays, based on the image data captured by the first and second cameras and the detected hinge angle, and as the current gaze vector changes, adjust the display of the three-dimensional view of the virtual object based on the change in the current gaze vector, in addition to adjustment of the three-dimensional view based on the detected hinge angle. In this aspect, additionally or alternatively, the sensor may be selected from the group consisting of a hinge angle sensor and a pair of inertial measurement units.

Another aspect provides a method for a mobile computing device including a housing having a first part and a second part coupled by a hinge, the first part including a first display, and the second part including a second display, and a sensor mounted in the housing and configured to detect a hinge angle between the first and second parts of the housing, the method comprising detecting the hinge angle; and rendering and causing to be displayed a two-dimensional view of a virtual object on the first display and a three-dimensional view of the virtual object on the second display, the three-dimensional view of the virtual object being rendered based on the detected hinge angle between the first and second parts of the housing. In this aspect, additionally or alternatively, the rendering of the three-dimensional view may be made according to a map that relates the detected hinge angle to a type of three-dimensional view to be displayed on the second display. In this aspect, additionally or alternatively, the type of three-dimensional view may be a perspective from which the three-dimensional view of the virtual object is taken. In this aspect, additionally or alternatively, the type of three-dimensional view may be a virtual camera angle that captures a view of a three-dimensional virtual environment. In this aspect, additionally or alternatively, the map may further relate the detected hinge angle to a type of two-dimensional view to be displayed on the first display. In this aspect, additionally or alternatively, the type of two-dimensional view may be a perspective from which the two-dimensional view of the virtual object is taken. In this aspect, additionally or alternatively, the two-dimensional view may be selected based on the detected gaze angle. In this aspect, additionally or alternatively, the two-dimensional view and three-dimensional view of the virtual object may be configured to be manipulated by touch on the displays by a user. In this aspect, additionally or alternatively, the method may further comprise processing image data captured of a user by first and second cameras respectively mounted in the first and second parts of the housing, estimating a current gaze vector of the user relative to the first and second displays, based on the image data captured by the first and second cameras and the detected hinge angle, and as the current gaze vector changes, adjusting the display of the three-dimensional view of the virtual object based on the change in the current gaze vector, in addition to adjustment of the three-dimensional view based on the detected hinge angle.

Another aspect provides a mobile computing device comprising a housing having a first part and a second part coupled by a hinge, the first part including a first display and the second part including a second display; a sensor mounted in the hinge and configured to detect a hinge angle between the first and second parts of the housing; and a processor mounted in the housing, the processor being configured to render and cause display of a three-dimensional view of a virtual environment from a point of view of a first virtual camera on the first display and a three-dimensional of a virtual environment from a point of view of a second camera on the second display; an orientation of at least one of the first camera and the second camera within the virtual environment being determined based upon the detected hinge angle It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device comprising:
a housing having a first part and a second part coupled by a hinge, the first part including a first display and the second part including a second display;
a sensor mounted in the housing, coupled to the hinge, and configured to detect a hinge angle between the first and second parts of the housing; and
a processor mounted in the housing, wherein the processor is configured to render and cause to be displayed on a display a two-dimensional view of a virtual object on the first display and a three-dimensional view of the virtual object at an orientation on the second display, and the three-dimensional view of the virtual object is rendered at the orientation based on the detected hinge angle between the first and second parts of the housing,
wherein a type of three-dimensional view for the three-dimensional view is a virtual camera angle that captures a view of a three-dimensional virtual environment, the virtual camera angle being determined based upon the detected hinge angle.

2. The mobile computing device of claim 1, wherein the processor is configured to render the three-dimensional view according to a map that relates the detected hinge angle to one or more types of three-dimensional views to be displayed on the second display.

3. The mobile computing device of claim 2, wherein the one or more types of three-dimensional views include a perspective from which the three-dimensional view of the virtual object is taken.

4. The mobile computing device of claim 2,
wherein the map further relates the detected hinge angle to a type of two-dimensional view for the two-dimensional view to be displayed on the first display.

5. The mobile computing device of claim 4, wherein the type of two-dimensional view is a perspective from which the two-dimensional view of the virtual object is taken.

6. The mobile computing device of claim 1,
wherein the two-dimensional view is selected based on the detected gaze angle.

7. The mobile computing device of claim 1, wherein the two-dimensional view and the three-dimensional view of the virtual object are configured to be manipulated by touch on the displays by a user.

8. The mobile computing device of claim 1, further comprising:
a first camera mounted in the first part of the housing; and
a second camera mounted in the second part of the housing, wherein
the processor is further configured to:
process image data captured of a user by the first and second cameras, and estimate a current gaze vector of the user relative to the first and second displays, based on the image data captured by the first and second cameras and the detected hinge angle, and
as the current gaze vector changes, adjust the display of the three-dimensional view of the virtual object based on the change in the current gaze vector, in addition to adjustment of the three-dimensional view based on the detected hinge angle.

9. The mobile computing device of claim 1, wherein the sensor is selected from the group consisting of a hinge angle sensor and a pair of inertial measurement units.

10. A method for a mobile computing device including a housing having a first part and a second part coupled by a hinge, the first part including a first display, and the second part including a second display, and a sensor mounted in the housing, coupled to the hinge, and configured to detect a hinge angle between the first and second parts of the housing, the method comprising:
detecting the hinge angle; and
rendering and causing to be displayed a two-dimensional view of a virtual object on the first display and a three-dimensional view of the virtual object at an orientation on the second display, wherein the three-dimensional view of the virtual object is rendered at the orientation based on the detected hinge angle between the first and second parts of the housing,
wherein a type of three-dimensional view for the three-dimensional view is a virtual camera angle that captures a view of a three-dimensional virtual environment, the virtual camera angle being determined based upon the detected hinge angle.

11. The method of claim 10, wherein
the rendering of the three-dimensional view is made according to a map that relates the detected hinge angle to one or more types of three-dimensional views to be displayed on the second display.

12. The method of claim 11, wherein the one or more types of three-dimensional views include a perspective from which the three-dimensional view of the virtual object is taken.

13. The method of claim 11,
wherein the map further relates the detected hinge angle to a type of two-dimensional view for the two-dimensional view to be displayed on the first display.

14. The method of claim 13, wherein the type of two-dimensional view is a perspective from which the two-dimensional view of the virtual object is taken.

15. The method of claim 10, wherein
the two-dimensional view is selected based on the detected gaze angle.

16. The method of claim 10, wherein
the two-dimensional view and three-dimensional view of the virtual object are configured to be manipulated by touch on the displays by a user.

17. The method of claim 10, further comprising:
processing image data captured of a user by first and second cameras respectively mounted in the first and second parts of the housing,
estimating a current gaze vector of the user relative to the first and second displays, based on the image data captured by the first and second cameras and the detected hinge angle, and as the current gaze vector changes, adjusting the display of the three-dimensional view of the virtual object based on the change in the current gaze vector, in addition to adjustment of the three-dimensional view based on the detected hinge angle.

18. A mobile computing device comprising:
a housing having a first part and a second part coupled by a hinge, the first part including a first display and the second part including a second display;
a sensor mounted in the hinge and configured to detect a hinge angle between the first and second parts of the housing; and
a processor mounted in the housing, wherein the processor is configured to render and cause display of a three-dimensional view of a virtual environment from a point of view of a first virtual camera on the first display and a three-dimensional view of a virtual environment at an orientation from a point of view of a second virtual camera on the second display,
wherein the orientation of at least the second virtual camera within the virtual environment is determined based upon the detected hinge angle, and
wherein a type of three-dimensional view for the three-dimensional view is a virtual camera angle that captures a view of a three-dimensional virtual environment, the virtual camera angle being determined based upon the detected hinge angle.

* * * * *